K. SMITH.
VALVE GEAR STOP FOR STEAM ENGINES.
APPLICATION FILED DEC. 14, 1911.

1,033,039.

Patented July 16, 1912.

2 SHEETS—SHEET 1.

WITNESSES:
J. B. Cole.
A. Voorhees.

INVENTOR
Kelsey Smith.
BY Geo. W. Upton.
Attorney

UNITED STATES PATENT OFFICE.

KELSEY SMITH, OF GIRARD, OHIO.

VALVE-GEAR STOP FOR STEAM-ENGINES.

1,033,039.  Specification of Letters Patent.  Patented July 16, 1912.

Application filed December 14, 1911. Serial No. 665,800.

*To all whom it may concern:*

Be it known that I, KELSEY SMITH, a citizen of the United States, residing at Girard, in the county of Trumbull and State of Ohio, have invented certain new and useful Improvements in Valve-Gear Stops for Steam-Engines, of which the following is a specification.

My invention relates to improvements in valve gear stops for steam-engines of the class represented by the double eccentric Corliss engines, in which the valve gear is provided with a knock off bar operated by a knock off cam attached to the governor rod; and, the object of my invention is to provide means for quickly putting the knock off bar out of operation and thereby shutting off the flow of steam into the cylinder, for the purpose of stopping the engine; and to that end my invention consists in the construction and improvements substantially as hereinafter specified. I attain that object by the mechanism illustrated in the accompanying drawings in which:—

Figure 1:
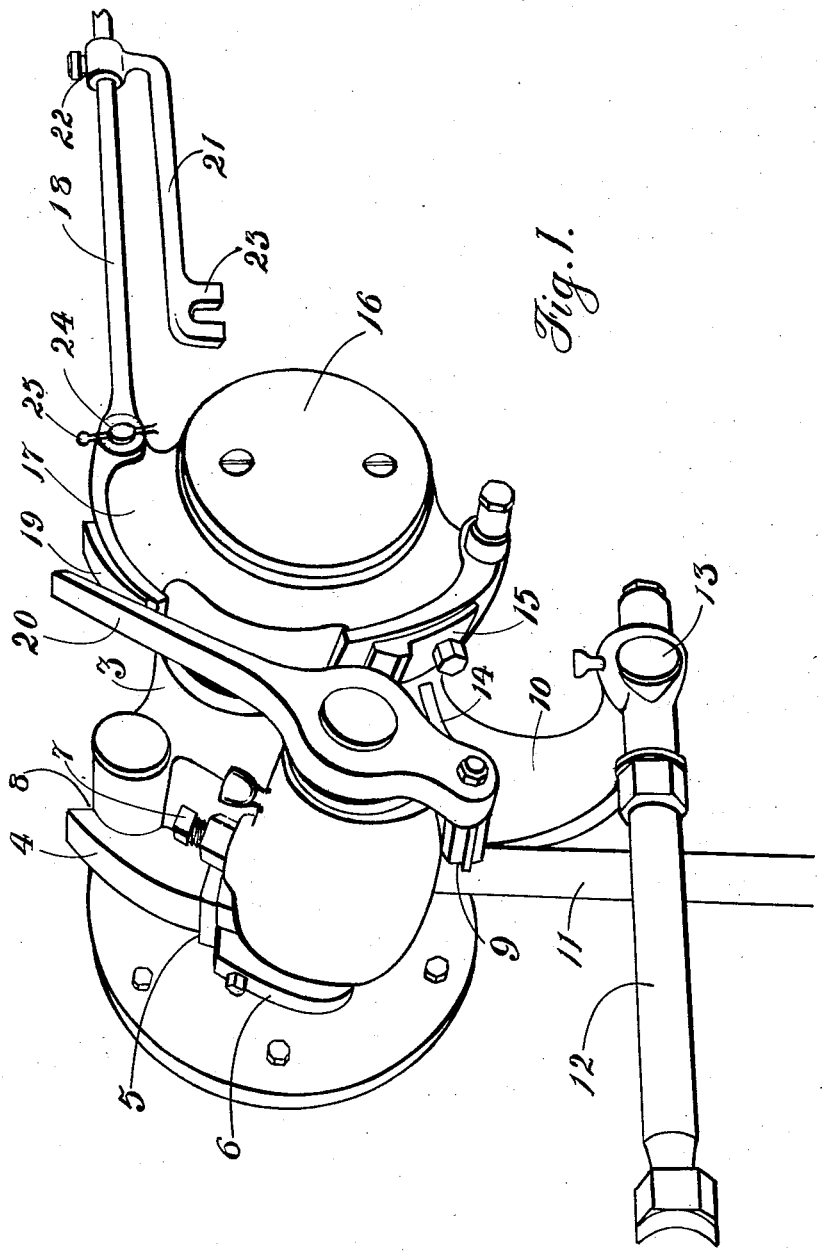
Figure 2:
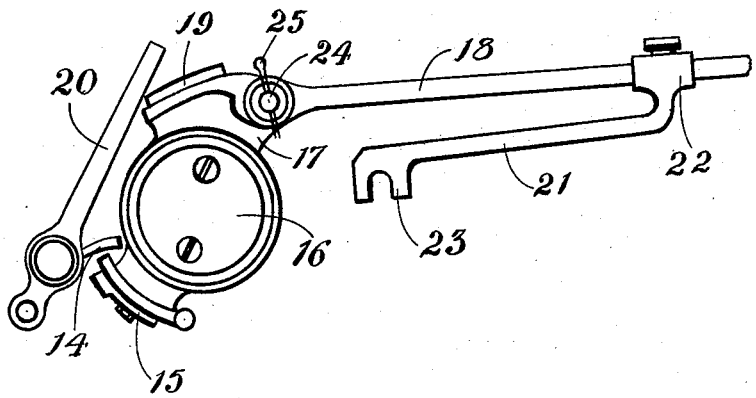
Figure 3:
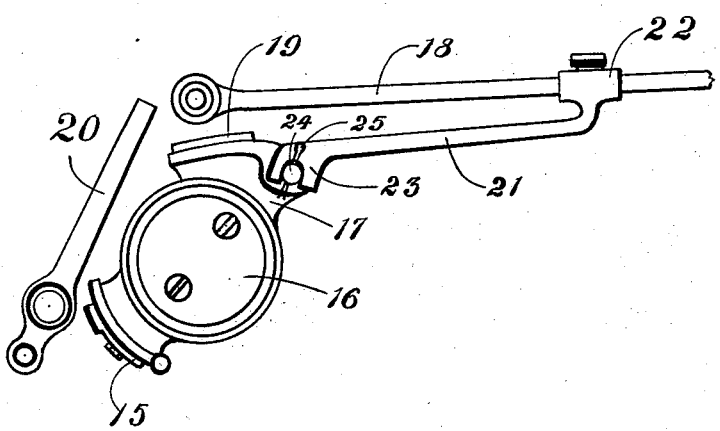

Figure 1 is a perspective of the steam valve gear of a double eccentric Corliss engine with my improvement attached. Fig. 2 is a view of parts of the valve gear with my improvement attached and not in operation, and Fig. 3 is a view of the same in operation.

Similar characters refer to similar parts throughout the several views.

The parts are represented in the drawings by numbers as follows:—

3 is the bonnet of the valve gear.
4 is the drop lever.
5 is a trip steel.
6 is a trip pin.
7 is the adjusting screw.
8 is an automatic closing pin.
9 is a spring pin.
10 is the steam lever.
11 is the drop rod.
12 is the steam rod.
13 is a key head.
14 is a spring.
15 is the safety cam.
16 is the bonnet collar.
17 is the knock off lever.
18 is the governor rod.
19 is the knock off cam.
20 is the knock off bar.
21 is an arm adjustably attached to the governor rod 18 by the clamped sleeve 22, and terminates in a pair of jaws, 23, of a convenient size to yoke over the rod, 24, (which protrudes from the knock off cam 19) after the governor rod 18 has been released therefrom by the withdrawal of a cotter pin 25, or the like, which I substitute for the nut usually employed to attach the end of the governor rod to the knock off cam.

In practice when the engineer wishes to stop the engine quickly, as for instance when, in a rolling mill, a metal plate has gone in between the rolls wrong and it is necessary to withdraw it, he first shuts off the steam by closing the throttle valve. Thereupon the engine begins to slow down and the governor falls, as the knock off cam 17 moves over to the right (as illustrated). When there is nothing between the rolls, and consequently no load on the engine, the cam 17 goes to the left (as illustrated), and stays there till the load is put on the engine, as by the passing of a plate between the rolls, when the governor balls drop toward each other and the cam 17 is pulled over to the right until the load is removed. As the governor rod itself moves but little and slowly; after the steam has been shut off, the engineer, without inconvenience or danger, pulls out the cotter pin 25, pulls off and releases governor rod 18 and drops the jaws 23, of the rod 21, over the rod 24. The rod 21 I make shorter than the corresponding part of the governor rod 18, with the result that, after it has been substituted for the governor rod, as above set forth, the knock off cam is held away from the knock off bar 20; operation of the bonnet collar 16 and spring 14 is prevented, the dash pot instantly draws down the drop rod 11, and the port of the valve is closed against further admission of steam to the cylinder; whereupon the engine stops. The engine can then be backed up and the plate or other obstruction can be taken from between the rolls.

The simplicity, advantages, operation and utility of my improvement will be at once apparent to those skilled in the art and familiar with double eccentric Corliss engines.

I claim:—

1. In a double eccentric steam engine an adjustable arm for attachment to its governor rod and having means for its attachment to the knock off cam of the steam valve, and to shorten the distance from the attachment point to the governor.

2. A shortener arm for attachment to the governor rod of a double eccentric steam engine, consisting of a rod shorter than the governor rod, clasping jaws at an angle with the direction of said rod, a sleeve, for the passage of the governor rod, attached to the other end of said rod and means for clamping said sleeved member to the governor rod.

3. In a double eccentric steam engine, a governor rod having an adjustable auxiliary member attached to it to reduce the total length of the governor rod when its auxiliary member is substituted for the governor rod itself.

4. In a double eccentric steam engine, the combination with a governor rod, normally attached to and operating the knock off cam of its steam valve gear; of means for disconnecting one end of said rod and said cam; together with an adjustable governor rod shortening arm; and means for attaching its extreme end to said cam as a terminal for the governor rod.

In testimony whereof I affix my signature in presence of two witnesses.

KELSEY SMITH.

Witnesses:
   Geo. W. Upton,
   J. B. Cole.

---

Copies of this patent may be obtained for five cents each, by addressing the "Commissioner of Patents, Washington, D. C."